(12) United States Patent
Hogg et al.

(10) Patent No.: US 7,487,588 B2
(45) Date of Patent: Feb. 10, 2009

(54) PROCESS FOR PRODUCING LEAVES FOR LEAF SEAL

(75) Inventors: Simon Ian Hogg, Rugby Warwickshire (GB); Nigel Anthony Rhodes, Newbold Verdon Leicestershire (GB); Erwin Schoenfeld, Baden-Daettwil (CH)

(73) Assignee: ALSTOM Technology Ltd., Baden (CH)

( * ) Notice: Subject to any disclaimer, the term of this patent is extended or adjusted under 35 U.S.C. 154(b) by 144 days.

(21) Appl. No.: 11/538,100

(22) Filed: Oct. 3, 2006

(65) Prior Publication Data
US 2007/0261225 A1 Nov. 15, 2007

Related U.S. Application Data

(63) Continuation of application No. PCT/EP2005/051735, filed on Apr. 20, 2005.

(30) Foreign Application Priority Data

Apr. 26, 2004 (GB) ................................ 0409247.4

(51) Int. Cl.
*B21D 53/84* (2006.01)
*F01D 11/02* (2006.01)

(52) U.S. Cl. ...................... 29/888.3; 29/557; 216/56; 216/100; 277/355; 277/412

(58) Field of Classification Search ............. 29/888.3, 29/458, 557; 277/355, 412, 421, 543; 216/41, 216/49, 56, 83, 90, 92, 100
See application file for complete search history.

(56) References Cited

U.S. PATENT DOCUMENTS

| 6,120,622 A | 9/2000 | Mayr et al. |
| 6,343,792 B1 | 2/2002 | Shinohara et al. |
| 6,553,639 B2 | 4/2003 | Hobbs et al. |
| 6,860,484 B2 * | 3/2005 | Urlichs ........................ 277/412 |
| 6,874,788 B2 | 4/2005 | Kono |
| 6,935,631 B2 * | 8/2005 | Inoue .......................... 277/355 |

(Continued)

FOREIGN PATENT DOCUMENTS

DE 19641375 12/1997

(Continued)

OTHER PUBLICATIONS

Search Report for Great Britain Patent App. No. 0409247.4 (Aug. 6, 2004).

(Continued)

*Primary Examiner*—David P Bryant
*Assistant Examiner*—Sarang Afzali
(74) *Attorney, Agent, or Firm*—Cermak Kenealy Vaidya & Nakajima LLP; Adam J. Cermak (57) ABSTRACT

In a process for producing leaves (20, 20') for a leaf seal, in particular as a seal for a gas turbine, which leaves (20, 20') are laterally delimited by a peripheral edge contour and have regions of different thicknesses (d1, d2), a simplification, without sacrificing precision, is achieved by virtue of the edge contour of the leaves (20, 20') being cut out of a metal sheet (28) by an etching process and the regions of different thicknesses (d1, d2) also being produced simultaneously as part of the etching process.

16 Claims, 6 Drawing Sheets

U.S. PATENT DOCUMENTS

| | | | |
|---|---|---|---|
| 7,047,638 B2 * | 5/2006 | Eldridge et al. | 29/884 |
| 7,201,378 B2 | 4/2007 | Kono | |
| 2004/0232621 A1 | 11/2004 | Kono | |
| 2007/0102886 A1 | 5/2007 | Uehara et al. | |

FOREIGN PATENT DOCUMENTS

| | | |
|---|---|---|
| DE | 19745184 | 4/1999 |
| EP | 0933568 | 8/1999 |
| EP | 1013975 | 6/2000 |
| EP | 1302708 | 4/2003 |
| EP | 1365181 | 11/2003 |
| EP | 1479953 | 11/2004 |
| EP | 1489340 | 12/2004 |
| GB | 2021210 | 11/1979 |
| WO | WO03/072287 | 9/2003 |
| WO | WO2005/103534 | 11/2005 |
| WO | WO2005/103535 | 11/2005 |
| WO | WO2005/103536 | 11/2005 |

OTHER PUBLICATIONS

International Search Report for PCT Patent App. No. PCT/EP2005/051735 (Aug. 3, 2005).

International Preliminary Examination Report for PCT Patent App. No. PCT/EP2005/051735.

* cited by examiner

PROCESS FOR PRODUCING LEAVES FOR LEAF SEAL

This application is a Continuation of, and claims priority under 35 U.S.C. §120 to, International application number PCT/EP2005/051735, filed 20 Apr. 2005, and claims priority therethrough under 35 U.S.C. §119 to Great Britain application no. 0409247.4, filed 26 Apr. 2004, the entireties of which are incorporated by reference herein.

BACKGROUND OF THE INVENTION

1. Field of the Invention

The present invention deals with the field of seals for rotary machines and to a process for producing leaves for a leaf seal.

2. Brief Description of the Related Art

A gas turbine includes a rotor, on which there are arranged various stages having compressor blades and turbine blades, as well as a stator housing. The rotor is mounted in bearings at each end of the rotor shaft.

Control of the gas flow within the gas turbine is of great importance both with regard to the functionality and with regard to the efficiency. At various points along the rotor shaft, seal technologies are used to reduce the axial flow of gas along the shaft. This is particularly important next to the bearings, in order to prevent the oil used in the bearings from being overheated by the hot gases of the gas stream.

Traditionally, two types of seal technologies—generally as alternatives but sometimes also in combination with one another—are used in this situation. These are labyrinth seals and brush seals.

In labyrinth seals, there is no metal-to-metal contact between the rotor and the stator; therefore, their sealing effect is relatively slight. However, they offer the advantage of low rotary friction, and consequently a virtually unlimited service life.

Brush seals, on the other hand, have higher friction losses on account of the friction between the ends of the bristles and the rotor shaft. This leads to wear, which limits the service life of the seal. However, brush seals offer improved inhibition of the axial gas flow, particularly in the case of relatively high axial pressure differences.

There are numerous restrictions on the use of these technologies for sealing purposes in gas turbines. First, the axial pressure difference which they are able to withstand is still rather low. In the case of brush seals, this is because of the bristles, which have the same rigidity in the axial and circumferential directions: high pressures can cause the bristles to blow back onto themselves in the axial direction. The seals also have little ability to permit and withstand significant radial movement.

The design of a brush seal is often a compromise between the use of a support plate, which is intended to provide sufficient axial support, and the aim not to restrict the radial movement.

To avoid the drawbacks of the known brush seals, U.S. Pat. No. B1 6,343,792 has proposed a leaf seal which performs the same function as either a labyrinth seal or a brush seal but has the advantages of both. Instead of the bristles, which are made from wires of circular cross section, thin metal leaves or lamellae are assembled in a set arrangement (cf. for example FIG. 3 of U.S. Pat. No. B1 6,343,792 or FIG. 1 of the present application). The leaves, whose surfaces are oriented substantially parallel to the axial direction, are much more rigid in the axial direction than in the circumferential direction. This means that the seal is able to withstand higher pressure differences without its ability to permit radial movements being restricted. Also, the wide area on the rotor which is covered by the tips of the leaves offers the option of generating a hydrodynamic force which can separate the leaf tips from the shaft during operation. This makes it possible to produce and maintain a spacing of a few micrometers, so that the wear, frictional heat and friction losses are reduced to almost zero.

The basic design incorporates a number of thin metal leaves which between them have a controlled air gap and are secured at a predetermined angle with respect to the radius. The air gap is a critical design parameter. It allows an air flow to occur in order thereby to generate the hydrodynamic effect; however, it must not be large enough to permit an excessive axial leakage flow.

Two variants of the leaf seal design are possible: in one variant, the leaves are blown downward, while in the other variant they are blown upward. The variant with the leaves which are blown downward includes the possibility of there being a spacing between the leaf tips and the shaft during assembly and start-up and of this gap being decreased in size to very small values by the use of an air stream between the leaves. On the other hand, the variant in which the leaves are blown upward includes the possibility of the leaf tips and shaft influencing one another slightly during start-up, and of producing a spacing when the shaft accelerates. In both cases, the flow of the medium through the air gaps between the leaves is critical, as is the control of the internal diameter of the seal which is produced by the leaf tips.

Figure 1:
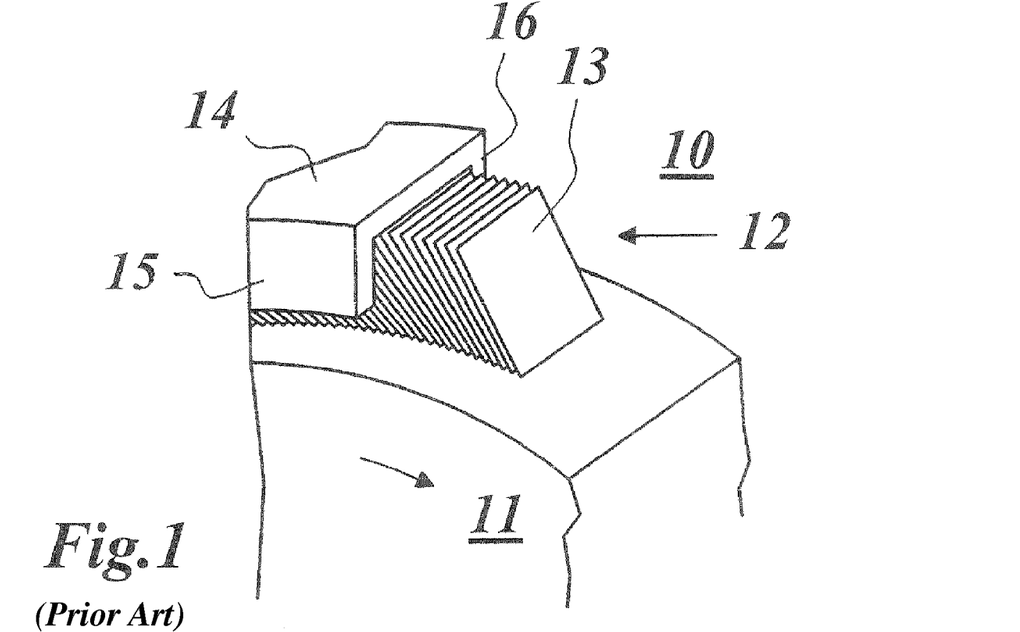
FIG. 1 shows a perspective side view of the typical structure of a leaf seal as used in a gas turbine.
Figure 3:
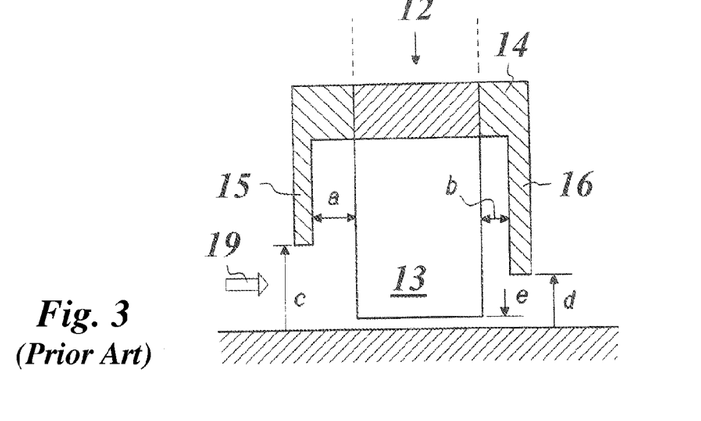
FIG. 3 shows the view of a leaf seal which is similar to that shown in FIG. 1 in the circumferential direction with a front and rear end plate.

The air flow through the leaves can be altered by using a front plate and a rear plate, which leave clear a narrow gap between the surfaces of the set of leaves and the plates (cf. the above-referenced FIG. 1 and 3). Careful design of these geometries makes it possible to control the upward or downward blowing effects. It may also be desirable for the downward blowing effect to be assisted by active supply of pressure along the length of the leaves or inward from the front side or from the rear-side directions.

One of the other main advantages of the leaf seal concept is a greater tolerance for the radial movement than in the case of the labyrinth or brush seals. There, this requires a considerable distance between the internal diameter of the front and rear-side plates and the shaft.

Depending on the selected geometry for the seal and on the diameter of the shaft to be sealed, the number of leaves may be a few thousand or tens of thousands. The accuracy with which they can be produced, assembled, and connected, while ensuring a reproducible air gap between each pair of leaves, is critical for successful implementation of any possible seal design.

The joining method for fixing the leaves in position could be a mechanical technique, such as clamping, welding, or brazing, or any possible combination thereof. In this context, it is very obviously important that there should be minimum disruption to the leaves or their relative positions during the joining process.

In particular the spacer elements which are placed between the leaves and set the width of the air gap are of importance in this context. The spacer elements can be designed as separate elements. This has the advantage that the leaves are relatively simple to produce, as elements of constant thickness. However, this also has the drawback that the spacer elements have to be produced separately and that the alternating assembly of the leaves and spacer elements to form a set of leaves is complex and can easily give rise to positioning errors. However, it is also possible for the spacer elements to be designed as integral elements of the leaves, which considerably simplifies assembly. In this case, however, the leaves have to be subjected to special machining in order to form the regions of different thicknesses.

To this end, it has already been proposed in the above-referenced U.S. Pat. No. B1 6,343,792 (cf. FIG. 27B of that document and the associated description in column 21, lines 25-34) that the stepped thickness regions of the leaves be produced with an integral spacer element by means of etching. The etching technique allows accurate setting of the thicknesses. However, a drawback in this case is that the etching, after the leaves have been cut to size, introduces an additional process step which complicates and lengthens production.

SUMMARY OF THE INVENTION

One aspect of the present invention includes a process for producing leaves with an integral spacer element for a leaf seal for rotary machines, in particular gas turbines, which avoids the drawbacks of known processes and is distinguished in particular by a high level of accuracy combined with a simplified process sequence.

Another aspect of the present invention includes the leaves being cut out of a metal sheet by etching and in the regions of different thicknesses also being produced simultaneously as part of the etching process required for this purpose.

To cut out the leaves, it is preferable for the metal sheet in each case to be etched through in a region corresponding to the edge contour, with the leaves advantageously being cut out of the metal sheet in such a way that, for easier handling and easier transportation, they remain connected, in a readily detachable manner, to the remaining metal sheet at predetermined connecting points.

A further improvement can be achieved if additional possibilities for controlling the flow of air within the set of leaves and around the set of leaves are created. For this purpose, it is preferable for at least one passage opening to be provided in each of the leaves, which opening is produced by etching through the metal sheet as part of the etching process without the need for additional process steps.

Production becomes particularly simple with regard to the subsequent leaf seal if the leaves each have an integral spacer element of increased thickness in order to set the distance between adjacent leaves, and if the integral spacer element is produced by etching away the areas located outside the spacer element to a reduced thickness, in which case the thickness in the region of the spacer element is preferably substantially equal to the original thickness of the metal sheet.

The etching process used is preferably a photochemical machining (PCM) process, in which, in a first step, the metal sheet is covered on one or both sides with a photoresist layer, in a second step, the photoresist layer is photographically patterned in such a manner that apertures in the photoresist layer are produced in predetermined regions in which the metal sheet is to have its thickness reduced by etching or is to be etched through, and in a third step, the metal sheet is etched through or etched away through the apertures in the photoresist layer.

In this context, in particular for the photographic patterning of the photoresist layer, the photoresist layer is exposed through a photomask.

The time required for the process can be shortened and the process can be simplified if, to etch through the metal sheet, the etching process is carried out simultaneously from opposite sides of the metal sheet.

A further variant of the process according to the invention leads to the leaves having in each case two integral spacer elements of increased thickness for setting the spacing between adjacent leaves, and to the two integral spacer elements being arranged laterally next to one another and being connected by a first folding region, the thickness of which is reduced by etching technology, in the manner of a film hinge, in such a way that the two integral spacer elements come to lie congruently over one another by way of a fold in the first folding region. This makes it possible in a simple way to also produce relatively large spacings between adjacent leaves with comparatively small initial sheet thicknesses. It goes without saying that, instead of one additional spacer element, a plurality of additional spacer elements can also be provided and can be incorporated into the leaf stack by being folded over one another.

In one preferred development of this variant, a plurality of leaves having, in each case, two integral spacer elements, are arranged next to one another and are connected to one another in each case by a second folding region. They form a row in such a way that the leaves and the integral spacer elements come to lie approximately congruently over one another by way of alternate, zigzag-shaped folding in the first and second folding regions. The contiguous leaves which are folded in a zigzag-shaped manner simplify the stacking and composition of the individual leaves to form the finished leaf seal.

In this type of folding, the required oblique positioning of the leaves in the stack can be achieved by the leaves and integral spacer elements of the row being displaced slightly with respect to one another in the longitudinal direction of the leaves, in such a way that an oblique stack of leaves and integral spacer elements results during folding.

BRIEF DESCRIPTION OF THE DRAWINGS

The invention is to be explained in more detail below on the basis of exemplary embodiments in conjunction with the drawing, in which.

DETAILED DESCRIPTION OF EXEMPLARY EMBODIMENTS

Figure 2:
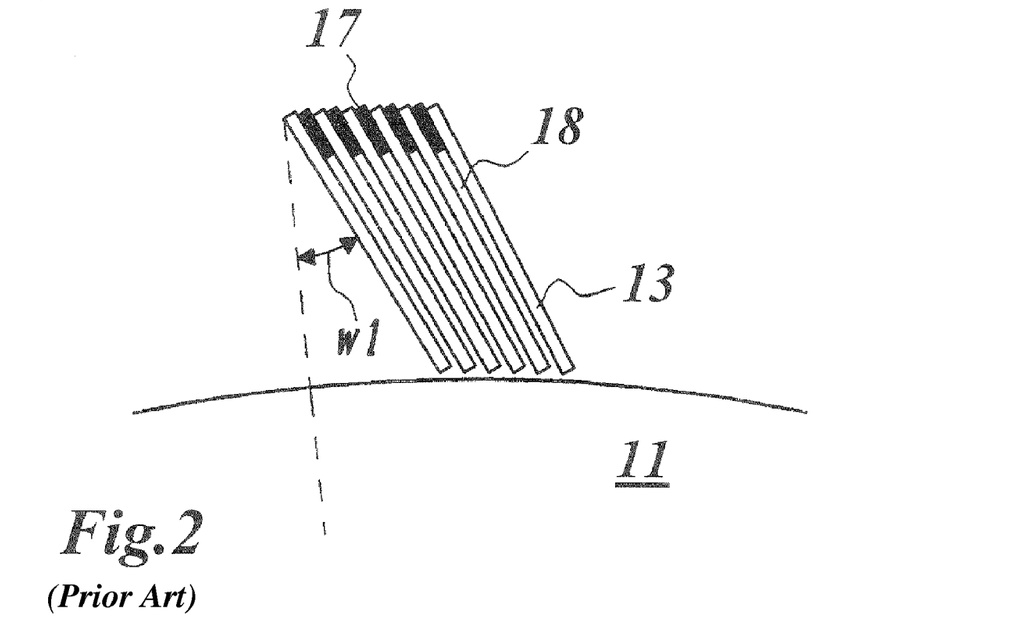
FIG. 2 shows a side view in the axial direction of the arrangement, inclined from the radial direction, of individual leaves with their spacer elements located between them.

FIG. 1 shows a perspective side view of the typical structure of a leaf seal as used in a gas turbine. The leaf seal 12 seals a rotor shaft 11, which rotates in the direction indicated by an arrow, of the gas turbine 10 with respect to a housing 14. In the annular space between the rotor shaft 11 and the housing 14, a set of thin leaves 13, which are spaced apart from one another at narrow intervals, is arranged in a ring. The surface of the leaves 13 is oriented parallel to the axis of rotation of the machine. In accordance with FIG. 2, the leaves are tilted out of the radial direction through an angle w1 and between them in each case have a narrow gap or space 18, which is preferably defined by spacer elements 17 arranged between the leaves 13. The spacer elements 17 shown in FIG. 2 are illustrated as separate elements. However, they may also be integrated in the leaves.

In accordance with FIGS. 1 and 3, the air flow through the leaves 13 can be altered by using a front and a rear end plate 15 and 16, respectively, which leave clear a narrow gap between the surfaces of the set of leaves and the end plates 15, 16 (distances a and b in FIG. 3). Careful design of these geometries enables the aforementioned upward or downward blowing effects to be controlled. It may also be desirable for the downward blowing effect to be assisted by active supply of pressure along the length of the leaves or inward from the front side or from the rear-side directions.

One of the other main advantages of the leaf seal concept illustrated in FIGS. 1 and 3 is a greater tolerance for the radial movement than in the case of the labyrinth or brush seals. This requires a considerable distance between the internal diameter of the front and rear-side end plates 15, 16 and the rotor shaft 11 (distances c and d in FIG. 3). The gap between the leaves 13 and the rotor shaft (distance e in FIG. 3) is only a few micrometers.

Now, according to an exemplary embodiment of the invention, a photochemical machining (PCM) process is used to produce the individual leaves of the leaf seal. In a development stage with small numbers, PCM offers considerable flexibility in terms of material thickness, component design, and lead time. However, PCM is also a production technique suitable for large numbers with the capacity to produce many tens of thousands of identical components quickly, accurately, and at a reasonable price.

Alternative techniques for the production of leaves include stamping from a thin metal sheet or cutting using a laser or an electrodischarge machining (EDM) process or other cutting techniques.

One major advantage of PCM over the abovementioned processes is the ability to selectively reduce the thickness of the metal sheet or metal foil at the same time as the edge profile is being cut. This is shown below in connection with FIG. 4.

Figure 4:
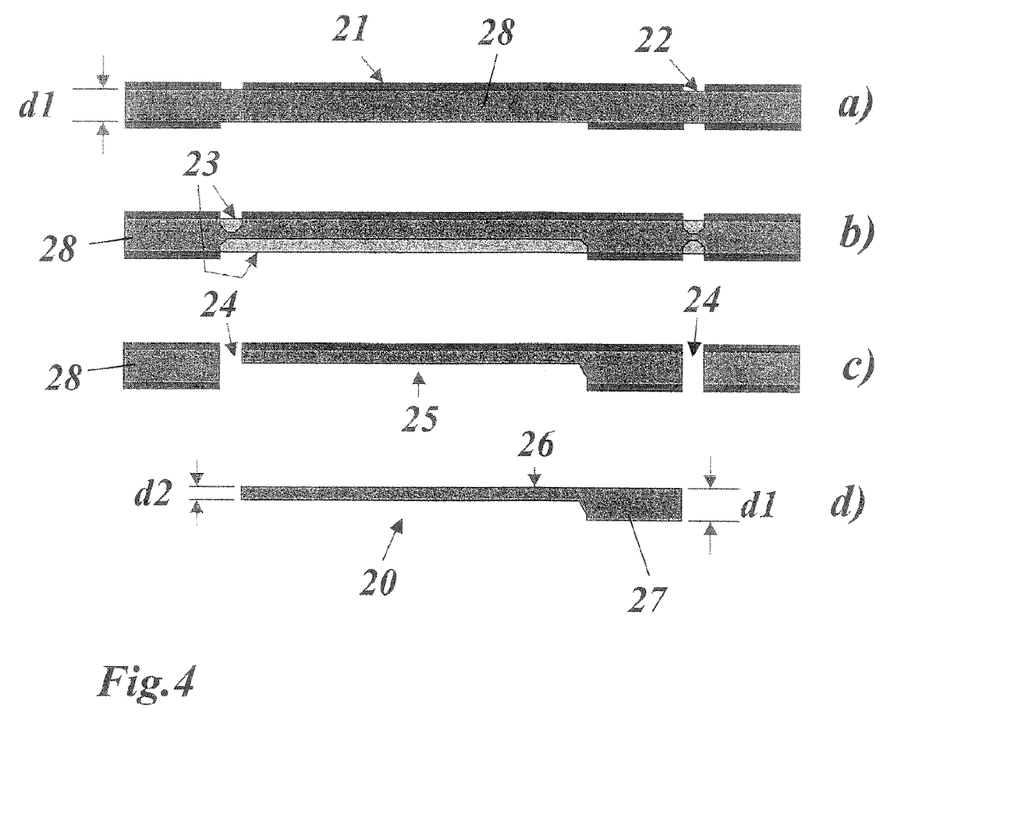
FIG. 4 shows a diagrammatic sectional view through various steps (a) to (d) involved in the photochemical production of a leaf in accordance with a preferred exemplary embodiment of the invention.

FIG. 4 diagrammatically depicts, proceeding from the top downward, a plurality of steps (a) to (d) involved in the production of a leaf in accordance with a preferred exemplary embodiment of the invention. The starting point is a metal sheet or metal foil 28 with a thickness d1. The metal sheet 28 is covered on both sides with a photoresist layer 21. The photoresist is, for example, a polymer which is cured by exposure to light. The photoresist layer 21 on both sides is selectively exposed through a photomask, with those regions in which the photoresist layer is to be retained being exposed to the light. The unexposed, remaining regions of the photoresist layers 21 are washed out after the exposure, so that the photoresist layer 21 is selectively removed in predetermined regions 22, as shown in FIG. 4(a).

The metal sheet 28 which has been prepared in this way is then immersed in an etching bath or placed into a spray chamber, where it is sprayed from both sides with an etching liquid. Now, in accordance with FIG. 4(b), etching regions 23 in which the material of the metal sheet 28 is gradually removed are formed in the regions 22 where the photoresist layer 21 has been selectively removed. The main direction of the etching process is from the surface of the metal sheet 28 inward; however, there is also a certain lateral undercut etching which has to be taken into account when designing the exposure mask. In certain regions, in particular in the annular region, which serves to detach the leaf 20 from the metal sheet 28 and defines the edge contour of the leaf 20, the etching is carried out from both sides, meeting in the interior of the metal sheet 28 and leading to etching-through 24 (FIG. 4(c)). The etching-through 24 "cuts" the leaf 20 out of the metal sheet 28. It also creates passage openings (30 in FIG. 5) in the leaves 20, which are used to control the air flow in the subsequent seal. At the same time as the etching-through, a large-area etching-away 25 is also performed, i.e., a targeted reduction in thickness from thickness d1 to thickness d2, in a predetermined region of the subsequent leaf (FIG. 4(c) and 4(d)). Additional flexibility in realizing desired geometries results from the setting of different etching rates on the two sides of the leaves 28, which can be achieved, for example, by using different etchant spray pressures. Finally, the leaf surface 26 is uncovered again by removal of the photoresist layers 21 (FIG. 4(d)).

The result is leaves 20 (FIG. 4(d)) which have different thicknesses d1 and d2 in predetermined regions. An appropriate selection of the thicknesses d1, d2 produces a leaf 20 which has an integral spacer element 27. Consequently, it is no longer necessary to alternately assemble leaves and spacer elements in order to produce a set of leaves with suitable air gaps.

The shape of the photoresist layer 21 on the surface of the metal sheet or metal foil 28 is definitively limited only by the standard parameters of the PCM process. For example, it may be possible or desirable to have significantly different configurations on opposite sides of the strip.

The example which is diagrammatically depicted in FIG. 4 illustrates the results of the etching at the same rate on both sides of the leaf until the regions in which the etching takes place simultaneously have been completely etched through. However, by suitable process control it is possible to demonstrate that the etching rate can be made different on the two sides, in order in this way to obtain a wide range of differently etched thicknesses within the original thicknesses. It is also possible to demonstrate that the PCM process can be applied more than once to a single leaf, with selected other regions being covered with a photoresist layer each time. This makes it possible to achieve a wide range of different thickness combinations within the same leaf.

Figure 5:
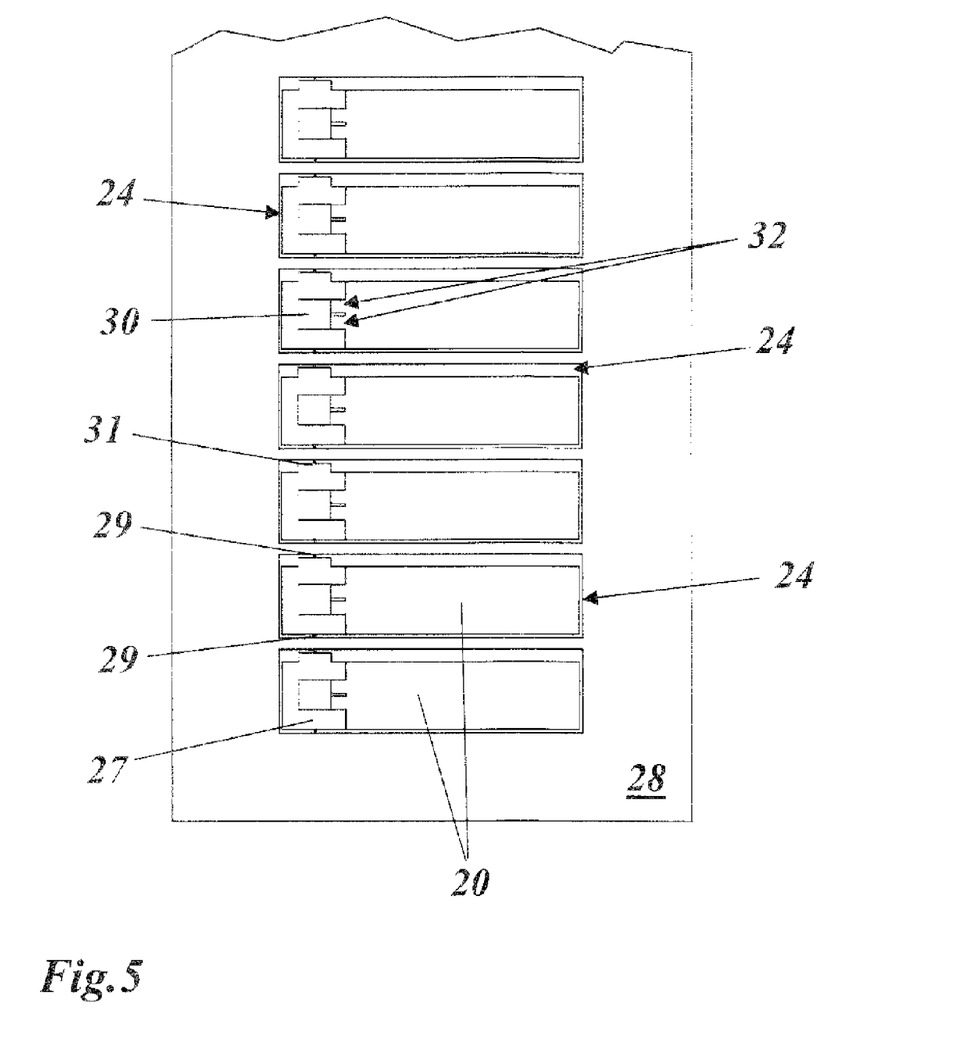
FIG. 5 shows a plan view from above of a metal sheet in which a multiplicity of leaves with integral spacer element and passage opening have been divided up, patterned and provided with stepped thickness regions using a photochemical process in accordance with the invention.

FIG. 5 shows an example of leaves which are produced by PCM and are used for prototype leaf seals. The leaves 20 have an integral spacer element 27 of the original thickness of the material, a (rectangular) passage opening 30 as a plenum for air pressure compensation, and a lateral arm 31 for positioning during assembly. Guide passages 32 which divert the direction of the air flow downward over the length of the leaf lead from the passage opening 30. The functional part of the leaf, i.e., the large region outside the integral spacer element 27, has been etched down to a reduced thickness. A multiplicity of the leaves 20 have been simultaneously detached from the original metal sheet 28 by peripheral, edge-side etching-through 24 in FIG. 5.

One particular advantage of the PCM process is that the leaves 20 do not need to be completely detached from the metal sheet 28 after the process has been concluded. In the example shown in FIG. 5, the leaves 20 are still held in place at their boundary at two opposite, small connecting points 29. This helps to ensure that they remain flat during transport and treatment but can still be broken out of the metal sheet with minimal force and damage. They can be broken out manually or in an automated process.

It is also readily apparent that isolated bores are easy to produce by means of the PCM process, thereby completely eliminating waste.

In the example shown in FIG. 5, each leaf is identical within the tolerances of the PCM process. However, it is also within the scope of the flexibility of the PCM process to provide a number of different configurations of the leaves 20 within the same photographic mask.

Figure 7:
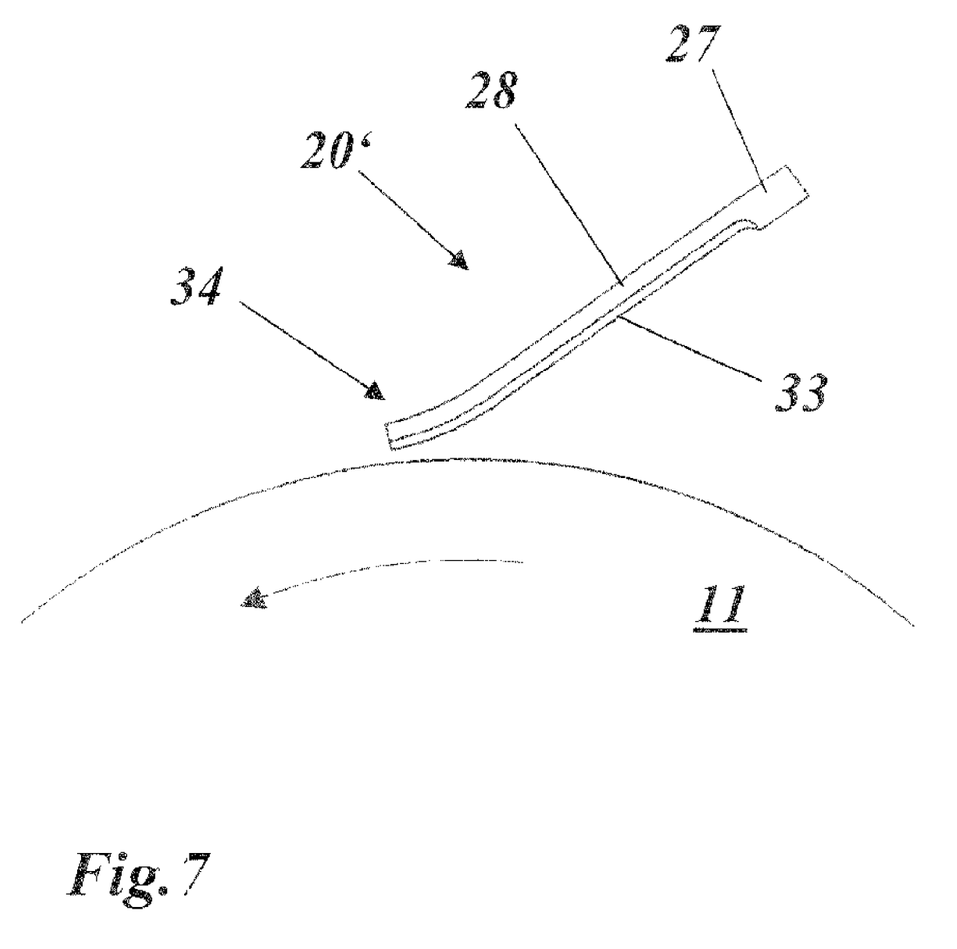
FIG. 7 diagrammatically depicts the thermal control of the seal clearance which can be achieved with a bimetal leaf.

In some applications, it may be desirable to use leaves which are configured as bimetal leaves in the leaf seal. The mismatch between the coefficients of thermal expansion of the two alloys used can be tailored in such a way that the leaves undergo controlled bending as the machine heats up or cools down (cf. bending 34 in FIG. 7). Furthermore, if there were any grinding contact between the leaves and the rotor shaft during operation, the frictional heat produced would lead to bimetal bending of this type. This effect can be optimized in such a way that a self-correcting gap is established between the tips of the leaves and the rotor shaft. However, it may also be desirable to ensure that the alloy used for the lower of the two layers is an alloy having appropriate abrasion properties.

Figure 6:
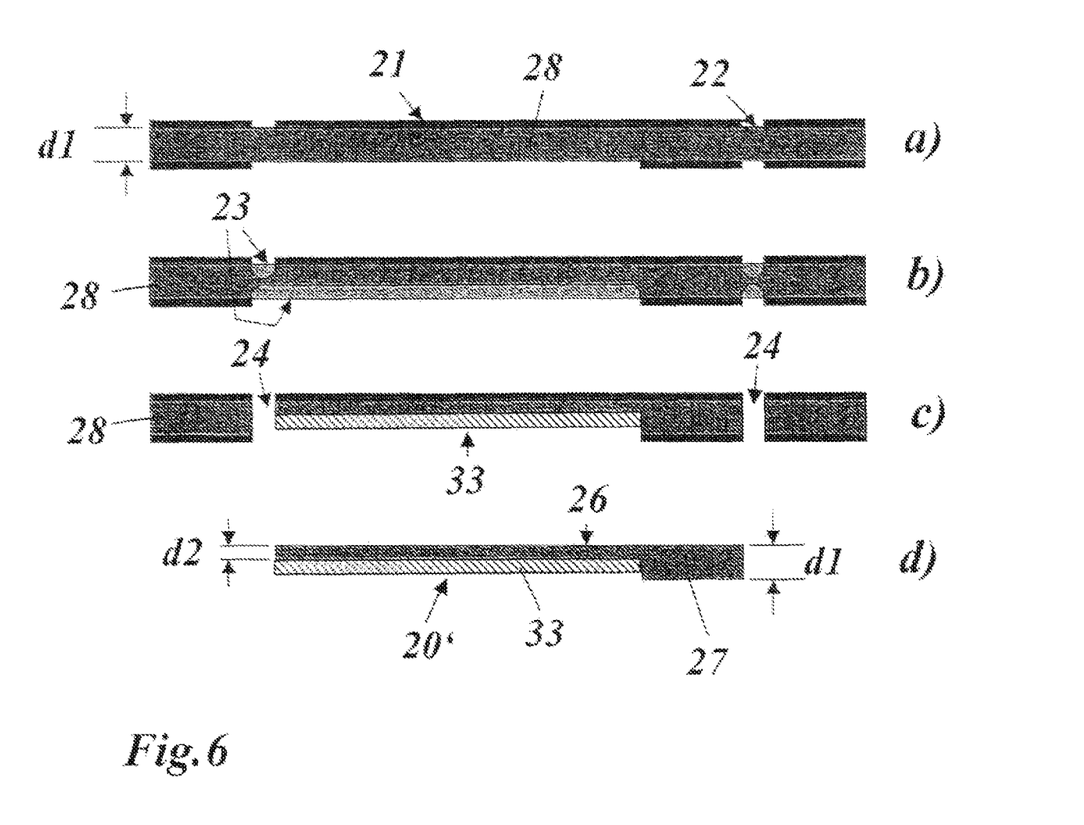
FIG. 6 shows an illustration, similar to that shown in FIG. 4, illustrating the production of a bimetal leaf as part of the photochemical process.

Should a bimetal leaf of this type be desirable, it can—as is shown in FIG. 6—be produced in a simple way as part of the PCM process described above. After, in accordance with FIG. 6a-c, the edge profile of the leaves 20' has been etched and their thickness reduced selectively in the regions which are not covered with the photoresist layer 21, as long as the masking is still present, a coating 33 of a metallic material, which has a significantly different coefficient of thermal expansion CTE than the base material of the metal sheet 28, is applied to the uncovered surface by a plating process or other application process. The masking with the photoresist layer 21 results in the coating 33 being deposited only on the underside of the leaf 20', without the integral spacer element 27 and therefore the subsequent process of assembling the seal being adversely affected. Depending on the particular requirements, the plating process may be electrolytic, non-electrolytic, diffusion-based, or of any other type. After the coating 33 has been applied, the photoresist layer 21 can be removed in the usual way (FIG. 6d).

If a bimetal leaf 20' of this type, given suitable installation, is heated through friction against the rotor shaft 11 or through a general change in temperature, the bimetal structure with the two layers 28 and 33 (FIG. 7) results, starting from the leaf tip, in a bending 34, which can be used to automatically set the distance between leaf tip and rotor shaft 11.

In the previously explained exemplary embodiments, individual leaves have been assumed, in which an integral spacer element (for example, 27 in FIG. 5) is produced at one end by retention of the original sheet thickness in a predefined region. Only a limited range for the thickness ratio of spacer element and leaf can be implemented in this way in the case of a predefined initial sheet thickness. The procedure according to FIG. 8 can be carried out in order for it to be possible for a relatively great thickness ratio to be achieved. In addition to the first integral spacer element 35 which is already known from FIG. 5 having the first passage opening 36 which lies in the center for the plenum and the first guide passage 37 for the compressed air, the leaf 39 from FIG. 8 comprises a second integral spacer element 35' having a second passage opening 36' and a second guide passage 37'. The second integral spacer element 35', which is arranged laterally next to the first integral spacer element 35, is configured mirror-symmetrically with respect to the latter and is connected thereto via a folding region 38 which lies in between. The folding region 38 is a sheet section of heavily reduced thickness which acts like a film hinge and makes it possible to fold the second spacer element 35' over the first spacer element 35, along a folding line 41 which extends in the longitudinal direction of the leaves, in such a way that both lie congruently over one another. As a result, the distance between two leaves can be doubled in practice with a constant sheet thickness. The folding region 38 of reduced thickness can also be produced at the same time during the etching process according to the invention. Otherwise, it goes without saying that further spacer elements which are connected via folding regions can be provided on the right-hand or left-hand side, in order to attain even greater spacings between the leaves, if required.

Figure 8:
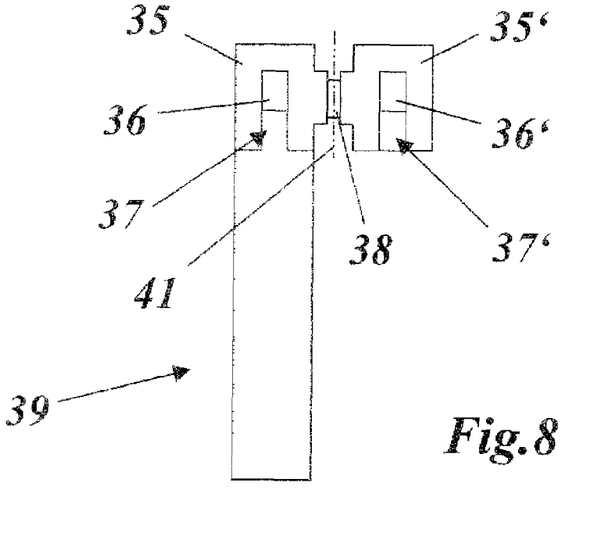
FIG. 8 shows a plan view from above of a leaf according to the invention having a laterally integrally formed second spacer element which is connected to the first spacer element by a folding region of reduced thickness and can be folded over the first spacer element.
Figure 9:
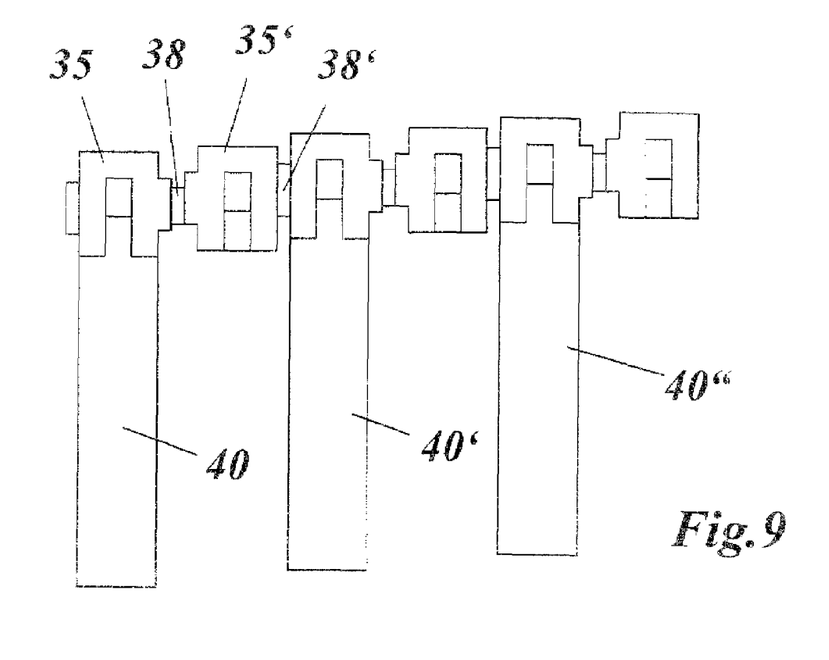
FIG. 9 shows a plan view from above of a contiguous row of a plurality of leaves and double spacer elements which are connected to one another by folding regions of reduced thickness and can be laid over one another by zigzag-shaped folding to form an oblique stack.

One preferred development of the exemplary embodiment which is shown in FIG. 8, is illustrated in FIG. 9. Here, a plurality of leaves 40, 40', 40" of the type which is shown in FIG. 8, having an integrally formed second spacer element, are arranged in a row next to one another and connected among one another by further folding regions 38'. The spacer elements 35, 35', which follow one another in the row, are offset with respect to one another in each case by a defined distance in the longitudinal direction of the leaves. The folding regions 38' have the same design and function as the folding regions 38, and they are also produced in the same way. The leaves and the spacer elements 35' which lie between them can be folded together in a zigzag-shaped manner along the folding lines 41 which extend in the folding regions 38, 38'. After folding together, the longitudinal offset results in an oblique leaf stack which substantially simplifies the assembly of the leaf seal. A leaf seal having an increased spacing between the leaves can be realized in a particularly simple manner by this type of manufacture and folding, without a post-treatment process, as is necessary, for example, in the solution of U.S. Pat. No. B2-6,553,639.

Overall, the invention can result in one or more of the following characteristics and advantages:

Leaves with an integral spacer element for simplified subsequent production are produced by etching away to different thicknesses.

The leaf thickness is controlled in predetermined regions.

The stepped change in thickness for the integral spacer element to produce the desired air gap between the leaves after they have been assembled and joined is controlled.

It is possible to set different metal thicknesses in a leaf by applying the basic PCM process one or more times.

The properties for controlling the air flow around and within the set of leaves can be taken into account in order to boost the generation of a hydrodynamic effect at the leaf tip. This includes a passage bore at the head of the leaf, which serves as a plenum in order to compensate for the supply of pressure, and guide passages which divert the direction of the air flow downward over the length of the leaf.

Thinner sections of the leaf are provided in order to absorb the majority of the elastic bending stress. This reduces the overall rigidity of the leaf and increases radial matching.

Increased spacings between the leaves can be realized as a result of foldable additional spacer elements.

A row of contiguous leaves and optionally additional spacer elements which can be folded together in a zig-zag-shaped manner simplifies assembly of the leaf seal.

LIST OF DESIGNATIONS

10 Gas turbine
11 Rotor shaft
12 Leaf seal
13, 20, 20' Leaf
14 Housing
15 End plate
17 Spacer element (separate)
18 Gap (space)
19 Gas stream
21 Photoresist layer
22 Region in which the photoresist layer has been removed
23 Etching region
24 Etching-through
25 Etching-away
26 Leaf surface
27 Spacer element (integral)
28 Metal sheet (metal foil)
29 Connecting point
30 Passage opening
31 Lateral arm
32 Guide passage
33 Coating (with high CTE)
34 Bending (thermally induced)
35, 35' Spacer element (integral)
36, 36' Passage opening
37, 37' Guide passage
38, 38' Folding region (film hinge)
39 Leaf
40, 40', 40" Leaf
41 Folding line
d1, d2 Thickness While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A process for producing leaves for a leaf seal, which leaves are laterally delimited by a peripheral edge contour and have regions of different thicknesses, the method comprising:
    cutting out the edge contour of the leaves from a metal sheet by an etching process from both sides of the metal sheet; and
    producing the regions of different thicknesses during said etching process.

2. The process as claimed in claim 1, wherein said etching process comprises a photochemical machining (PCM) process, including:
    covering the metal sheet on one or both sides with a photoresist layer;
    photographically patterning the photoresist layer so that the photoresist layer is selectively removed in predetermined regions in which the metal sheet is to have its thickness reduced by etching or is to be etched through; and
    selectively etching away or through the metal sheet in the regions where the photoresist layer has been removed.

3. The process as claimed in claim 2, further comprising:
    providing an area, which area has been etched away in order to reduce the thickness in the regions where photoresist layer has been selectively removed, with a coating having a significantly different coefficient of thermal expansion (CTE) than the metal of the metal sheet.

4. The process as claimed in claim 3, wherein providing the coating comprises applying the coating in the regions where the photoresist layer has been selectively removed.

5. The process as claimed in claim 3, wherein providing the coating comprises plating.

6. The process as claimed in claim 2, wherein photographically patterning the photoresist layer comprises exposing the photoresist layer through a photomask.

7. The process as claimed in claim 2, wherein etching comprises etching through the metal sheet, and wherein said etching process is simultaneously performed from opposite sides of the metal sheet.

8. The process as claimed in claim 1, wherein cutting out the edge contour comprises etching through the metal sheet in a region corresponding to the edge contour.

9. The process as claimed in claim 8, wherein cutting out the leaves from the metal sheet comprises cutting so that the leaves remain detachably connected to the remaining metal sheet at predetermined connecting points.

10. The process as claimed in claim 1, wherein the leaves each have at least one integral spacer element of increased thickness in order to set the distance between adjacent leaves, and wherein etching comprises etching away areas located outside the spacer element to a reduced thickness, to form the at least one integral spacer element.

11. The process as claimed in claim 10, wherein the thickness in the region of the at least one spacer element is substantially equal to the original thickness of the metal sheet.

12. The process as claimed in claim 1, wherein etching comprises etching to form at least one passage opening in each of the leaves through the metal sheet.

13. The process as claimed in claim 1, wherein the leaf seal comprises a seal for a gas turbine.

14. A process for producing leaves for a leaf seal, which leaves are laterally delimited by a peripheral edge contour and have regions of different thicknesses, the method comprising:
    cutting out the edge contour of the leaves from a metal sheet by an etching process;
    producing the regions of different thicknesses during said etching process;
    wherein the leaves each have two integral spacer elements of increased thickness for setting the spacing between adjacent leaves, and the two integral spacer elements are arranged laterally next to one another and are connected by a first folding region the thickness of which is reduced by said etching, said first folding region forming a film hinge, so that the two integral spacer elements come to lie congruently over one another when folded together at the first folding region; and wherein etching comprises etching away areas located outside the spacer elements to a reduced thickness, to form the two integral spacer elements.

15. The process as claimed in claim 14, wherein a plurality of leaves each having two integral spacer elements are arranged next to one another and are each connected to one another by a second folding region and form a row so that the plurality of leaves and the integral spacer elements come to lie approximately congruently over one another by way of alternate, zigzag-shaped fold when folded in the first and second folding regions.

16. The process as claimed in claim 15, further comprising:

displacing the plurality of leaves and integral spacer elements of the row slightly with respect to one another in the longitudinal direction of the plurality of leaves, so that an oblique stack of leaves and integral spacer elements results when folded.

* * * * *